(12) United States Patent  
Zeng et al.

(10) Patent No.: US 11,875,599 B2  
(45) Date of Patent: Jan. 16, 2024

(54) METHOD AND DEVICE FOR DETECTING BLURRINESS OF HUMAN FACE IN IMAGE AND COMPUTER-READABLE STORAGE MEDIUM

(71) Applicant: UBTECH ROBOTICS CORP LTD, Shenzhen (CN)

(72) Inventors: Yusheng Zeng, Shenzhen (CN); Yepeng Liu, Shenzhen (CN); Jun Cheng, Shenzhen (CN); Jianxin Pang, Shenzhen (CN); Jing Gu, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 330 days.

(21) Appl. No.: 17/393,408

(22) Filed: Aug. 4, 2021

(65) Prior Publication Data

US 2022/0044004 A1 Feb. 10, 2022

(30) Foreign Application Priority Data

Aug. 5, 2020 (CN) .......................... 202010776747.1

(51) Int. Cl.
*G06V 40/16* (2022.01)
*G06V 10/46* (2022.01)
(Continued)

(52) U.S. Cl.
CPC .......... *G06V 40/161* (2022.01); *G06F 18/214* (2023.01); *G06F 18/2431* (2023.01);
(Continued)

(58) Field of Classification Search
CPC .. G06V 40/161; G06V 10/462; G06V 10/993; G06V 10/454; G06V 10/82; G06V 40/171; G06V 40/16; G06V 40/172; G06V 40/168; G06V 10/764; G06V 40/165; G06V 40/169; G06V 10/25; G06V 40/45; G06V 10/774; G06V 20/41; G06V 20/46; G06V 20/52; G06F 18/214; G06F 18/2431; G06F 18/2413; G06F 21/32; G06N 3/045; G06N 3/08; G06N 3/084; G06N 3/088; G06T 7/0002; G06T 7/50; G06T 2207/20081; G06T 2207/20084; G06T 2207/30168; G06T 2207/30201
See application file for complete search history.

(56) References Cited

U.S. PATENT DOCUMENTS 9,210,327 B2 * 12/2015 Aggarwal ............... G06T 5/003  
10,025,950 B1 * 7/2018 Avasarala ......... G06F 18/23213  
(Continued)

*Primary Examiner* — Michael S Osinski

(57) ABSTRACT

A method for detecting blurriness of a human face in an image includes: performing a face detection in a target image; when a human face is detected in the target image, cropping the human face from the target image to obtain a face image and inputting the face image to a first neural network model to perform preliminary detection on a blurriness of the human face in the face image to obtain a preliminary detection result; and when the preliminary detection result meets a deep detection condition, inputting the face image to a second neural network model to perform deep detection on the blurriness of the human face in the face image to obtain a deep detection result.

20 Claims, 9 Drawing Sheets

(51) Int. Cl.
*G06V 10/98* (2022.01)
*G06N 3/08* (2023.01)
*G06F 18/214* (2023.01)
*G06F 18/2431* (2023.01)
*G06N 3/045* (2023.01)

(52) U.S. Cl.
CPC ............... *G06N 3/045* (2023.01); *G06N 3/08* (2013.01); *G06V 10/462* (2022.01); *G06V 10/993* (2022.01)

(56) References Cited

U.S. PATENT DOCUMENTS

| | | | | |
|---|---|---|---|---|
| 10,891,723 | B1* | 1/2021 | Chung | G06N 3/088 |
| 10,902,244 | B2* | 1/2021 | An | G06F 18/2414 |
| 11,106,919 | B1* | 8/2021 | Balogh | G06F 9/4843 |
| 11,163,978 | B2* | 11/2021 | Liang | G06V 10/42 |
| 11,176,393 | B2* | 11/2021 | Wu | G06V 40/172 |
| 11,210,502 | B2* | 12/2021 | Zheng | G06V 40/172 |
| 11,373,443 | B2* | 6/2022 | Wang | G06V 40/169 |
| 11,455,831 | B2* | 9/2022 | Qiu | G06V 10/82 |
| 11,462,052 | B2* | 10/2022 | Hayasaka | G06T 7/0002 |
| 2016/0140436 | A1* | 5/2016 | Yin | G06F 18/2431 706/20 |
| 2017/0178058 | A1* | 6/2017 | Bhat | G06T 7/0002 |
| 2017/0294010 | A1* | 10/2017 | Shen | G06N 3/08 |
| 2018/0165546 | A1* | 6/2018 | Skans | G06N 3/084 |
| 2018/0276455 | A1* | 9/2018 | An | G06V 10/82 |
| 2018/0357501 | A1* | 12/2018 | Ma | G06V 10/82 |
| 2018/0373924 | A1* | 12/2018 | Yoo | G06V 10/454 |
| 2019/0087686 | A1* | 3/2019 | Du | G06V 10/806 |
| 2019/0102603 | A1* | 4/2019 | Du | G06V 10/764 |
| 2019/0205616 | A1* | 7/2019 | Hong | G06V 40/171 |
| 2019/0311186 | A1* | 10/2019 | Chen | G06V 40/172 |
| 2019/0318156 | A1* | 10/2019 | Wu | G06V 40/45 |
| 2019/0347474 | A1* | 11/2019 | Cyrus | G06N 3/045 |
| 2020/0137298 | A1* | 4/2020 | Eslami | H04N 23/632 |
| 2020/0151860 | A1* | 5/2020 | Safdarnejad | G06T 7/162 |
| 2020/0265219 | A1* | 8/2020 | Liu | G06V 40/165 |
| 2020/0327353 | A1* | 10/2020 | Zhou | G06V 10/25 |
| 2020/0334793 | A1* | 10/2020 | Chen | G06T 7/187 |
| 2020/0387748 | A1* | 12/2020 | Zhu | G06V 40/161 |
| 2020/0410212 | A1* | 12/2020 | Huang | G06V 40/165 |
| 2021/0034842 | A1* | 2/2021 | Kang | G06V 20/52 |
| 2021/0049499 | A1* | 2/2021 | Ho | G06V 10/95 |
| 2021/0065360 | A1* | 3/2021 | Laaksonen | G06N 3/08 |
| 2021/0073953 | A1* | 3/2021 | Lee | G06T 7/571 |
| 2021/0082136 | A1* | 3/2021 | Nikitidis | G06V 40/172 |
| 2021/0125639 | A1* | 4/2021 | Cai | G06V 40/10 |
| 2021/0158554 | A1* | 5/2021 | Asawaroengchai | G06T 7/194 |
| 2021/0183020 | A1* | 6/2021 | Gollanapalli | H04N 19/85 |
| 2021/0272253 | A1* | 9/2021 | Lin | G06V 40/161 |
| 2021/0279528 | A1* | 9/2021 | Sachdeva | G06V 10/7784 |
| 2021/0326574 | A1* | 10/2021 | Wu | G06F 18/285 |
| 2021/0327431 | A1* | 10/2021 | Stewart | G06V 40/45 |
| 2021/0352206 | A1* | 11/2021 | Chan | G06V 40/166 |
| 2021/0382970 | A1* | 12/2021 | Odinokikh | G06N 3/045 |
| 2021/0398139 | A1* | 12/2021 | Zhang | G06Q 30/0201 |
| 2022/0012533 | A1* | 1/2022 | Yue | G06N 3/08 |
| 2022/0036536 | A1* | 2/2022 | Baijal | G06F 18/214 |
| 2022/0083795 | A1* | 3/2022 | Zhang | G06V 40/16 |
| 2022/0084384 | A1* | 3/2022 | Wang | G06N 3/02 |
| 2022/0172517 | A1* | 6/2022 | Kuta | G06T 11/60 |
| 2022/0207850 | A1* | 6/2022 | Okuike | G06V 20/584 |
| 2022/0237829 | A1* | 7/2022 | Ren | G06T 11/00 |
| 2022/0237943 | A1* | 7/2022 | Wang | G06V 40/172 |
| 2022/0245961 | A1* | 8/2022 | Yan | G06T 11/001 |
| 2022/0270215 | A1* | 8/2022 | Lee | G06T 11/00 |
| 2022/0277066 | A1* | 9/2022 | Levine | B42D 25/305 |
| 2023/0082834 | A1* | 3/2023 | Verbeke | G06V 40/168 |
| 2023/0085605 | A1* | 3/2023 | Zhang | G06T 3/40 345/589 |
| 2023/0234503 | A1* | 7/2023 | Eki | G06V 10/12 348/373 |
| 2023/0252662 | A1* | 8/2023 | Nikitidis | G06V 40/16 382/103 |

\* cited by examiner

METHOD AND DEVICE FOR DETECTING BLURRINESS OF HUMAN FACE IN IMAGE AND COMPUTER-READABLE STORAGE MEDIUM

CROSS REFERENCE TO RELATED APPLICATIONS

This application claims priority to Chinese Patent Application No. CN202010776747.1, filed Aug. 5, 2020, which is hereby incorporated by reference herein as if set forth in its entirety.

BACKGROUND

1. Technical Field

The present disclosure generally relates to face detection technologies, and particularly to a method and device for detecting blurriness of a human face in a target image.

2. Description of Related Art

Face recognition systems that work with focused images have difficulty when presented with blurred data, which in general arise due to out-of-focus lens, atmospheric turbulence, and relative motion between the sensor and objects in the scene.

Some conventional recognition systems use gradient values to indicate the clarity of images. One problem with such approach is when there is noise interference (such as external ambient light or other noise interference), the image gradient values cannot accurately reflect the clarity of images.

Therefore, there is a need to provide a method for detecting the blurriness of a human face in an image and a device to overcome the above-mentioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
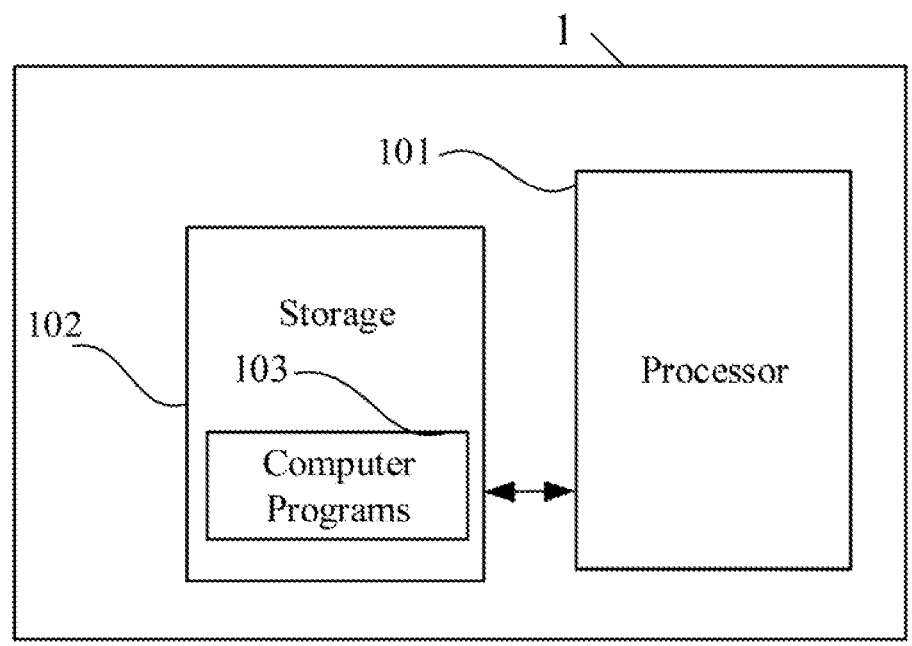
FIG. 1 is a schematic block diagram of a device for detecting blurriness of a human face in a target image according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The method for detecting blurriness of a human face in an image according to embodiments of the present disclosure can be implemented by various devices. These devices may include robots, mobile phones, tablet computers, wearable devices, vehicle-mounted devices, augmented reality (AR) devices, virtual reality (VR) devices, notebook computers, ultra-mobile personal computers (UMPC), netbooks, and personal digital assistants (PDAs). The present disclosure does not impose any restrictions on the type of the devices implementing the method.

Referring to FIG. 1, in one embodiment, a device 1 for implementing the method for detecting blurriness of a human face in an image may include a processor 101, a storage 102, and one or more executable computer programs 103 that are stored in the storage 102. The processor 101 is electrically connected to the storage 105, and performs corresponding operations by executing the executable computer programs 103 stored in the storage 102. When the processor 101 executes the computer programs 103, the steps in the embodiments of the method for controlling the device 1, such as steps S101 to S103 in FIG. 2, steps S1021 to S1024 in FIG. 3, steps S1031 to S1033 in FIG. 4, steps S201 to S204 in FIG. 5, and steps S301 to S303 in FIG. 6 are implemented.

The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like.

The storage 102 may be an internal storage unit of the robot 1, such as a hard disk or a memory. The storage 102 may also be an external storage device of the robot 1, such as a plug-in hard disk, a smart memory card (SMC), and a secure digital (SD) card, or any suitable flash cards. Furthermore, the storage 102 may also include both an internal storage unit and an external storage device. The storage 102 is used to store computer programs, other programs, and data required by the robot. The storage 102 can also be used to temporarily store data that have been output or is about to be output.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the robot 1. For example, the one or more computer programs 112 may be divided into a detection module 601, a first obtaining module 602, and a second obtaining module 603 as shown in FIG. 6.

Figure 2:
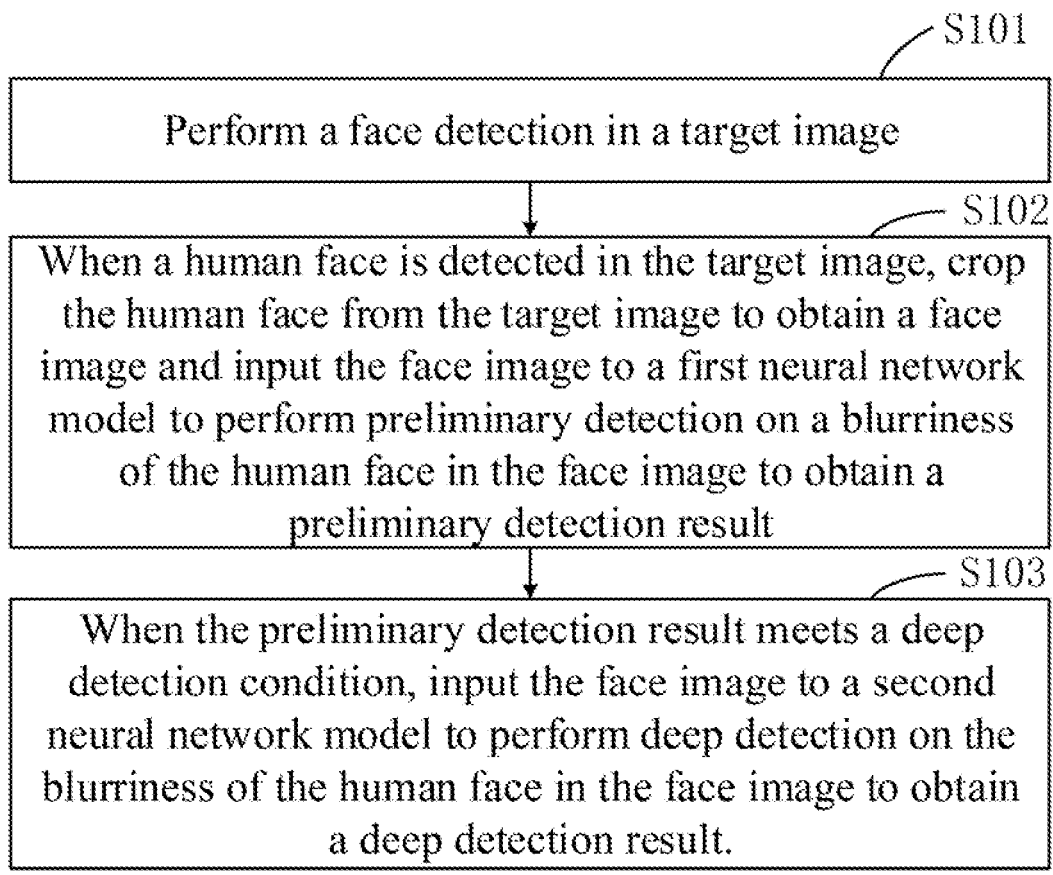
FIG. 2 is a flowchart of a method for detecting blurriness of a human face in a target image according to one embodiment.

Referring to FIG. 2, in one embodiment, a method for detecting blurriness of a human face in an image may include the following steps.

Step S101: Perform a face detection in a target image.

The target image may be captured by an image capturing device of the device 1, such as a camera. The target image may be obtained from a video streaming captured by the image capturing device. The device 1 may receive the target image from an external device. The device 1 may perform the face detection by executing a face detection algorithm to determine the position and number of faces in the target image.

Step S102: In response to detection of a human face in the target image, crop the human face from the target image to obtain a face image and input the face image to a first neural network model to perform preliminary detection on a blurriness of the human face in the face image to obtain a preliminary detection result.

When there is a human face in the target image, the device 1 may crop the human face from the target image based on the position of the human face to obtain a face image. The device 1 may then input the face image to a first neural network model to perform preliminary detection on a blurriness of the human face in the face image to obtain and output a preliminary detection result. The first neural network model is a neural network model that performs preliminary detection on the blurriness of the human face in the face image. The blurriness is configured to reflect the clarity of the human face in the face image3

In one embodiment, the first neural network model may be trained before step S102 to obtain a pre-trained first neural network model. The output result of the pre-trained first neural network model is the facial blurriness classification result of the face image. The first neural network model can use a lightweight network for network design, such as a neural network model constructed based on a lightweight neural network such as moblenetv2, mobilenetv3_small, smallmobilenetv2, shufflenetv2 or mobileface. The lightweight neural network models are suitable for deployment on robots.

In one embodiment, a lightweight network can be used for network design, such as building a neural network model based on mobilenetv2, which has a better classification effect. The network structure based on the mobilenetv2 model is shown in Table 1 below.

TABLE 1

| Input | Operator | t | c | n | s |
| --- | --- | --- | --- | --- | --- |
| 64,64,3 | conv3*3 | — | 64 | 1 | 1 |
| 64,64,64 | Depthwise conv3*3 | — | 64 | 1 | 1 |
| 64,64,64 | bottleneck | 2 | 64 | 5 | 2 |
| 31,31,64 | bottleneck | 4 | 128 | 1 | 2 |
| 15,15,128 | bottleneck | 2 | 128 | 6 | 1 |
| 15,15,128 | bottleneck | 4 | 128 | 1 | 2 |
| 7,7,128 | bottleneck | 2 | 128 | 2 | 1 |
| 7,7,128 | conv1*1 | — | 512 | 1 | 1 |
| 7,7,512 | Linear GDconv7*7 | — | 512 | 1 | 1 |
| 1,1,512 | Linear conv1*1 | — | X | 1 | 1 |

In Table 1, t represents the transposition amplification factor in bottleneck, c represents the number of convolution kernel channels, n represents the number of operator repetitions, and s represents stride in case of the device 1 is a humanoid robot. For example, the second row in Table 1 can represent the convolutional layer of the input image with a size of 64×64×3 (where 3 means that the image has three channels) convolved with a 3×3 convolution kernel (i.e., cony 3*3). Sine the layer has 64 convolution kernel channels, each convolution kernel channel will generate a 64×64×1 image, and the final image data output by this layer is 64×64×64 (i.e., the input of the third row in Table 1), which has 64 channels. Similarly, the output obtained after the input of the nth row in Table 1 is operated on the corresponding row is used as the input of the (n+1)th row. The algorithm derivation process of the output obtained from the input of each line can refer to the derivation process of the network model structure of mobilenetv2, which will not be repeated.

Figure 3:
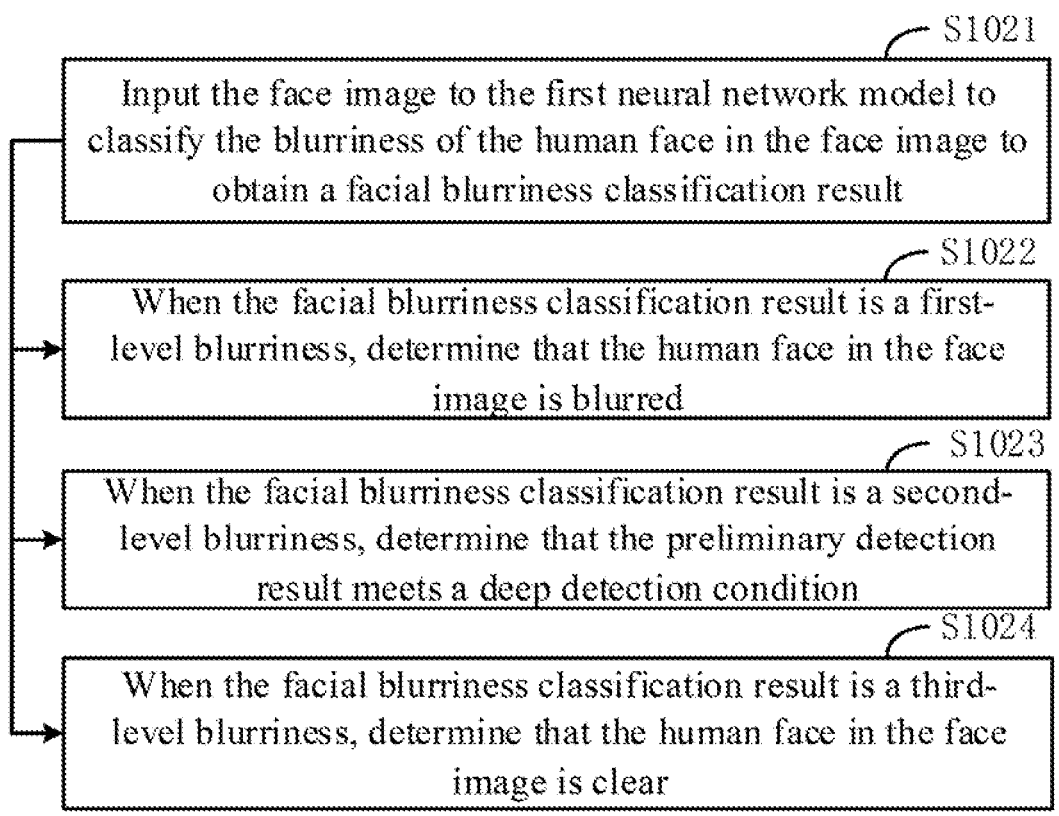
FIG. 3 is a flowchart of a method for obtaining a preliminary detection result according to one embodiment.

Referring to FIG. 3, in one embodiment, step S102 may further include steps S1021 to S1024.

Step S1021: Input the face image to the first neural network model to classify the blurriness of the human face in the face image to obtain a facial blurriness classification result, wherein the facial blurriness classification result may include a first-level blurriness, a second-level blurriness, and a third-level blurriness that are arranged in descending order of blurriness.

In one embodiment, the first neural network model here is a classification model that has been trained and is used to classify the input face images by blurriness, and the obtained preliminary detection result is the result of classifying the blurriness.

In a specific application scenario, the classification task of the first neural network model can be divided into three categories for training in advance, such as first-level blurriness, second-level blurriness, and third-level blurriness arranged in order of blurriness from large to small. The first-level blurriness is to indicate a blurred face image, the second-level blurriness is to indicate a moderate clear face image, and the third-level blurriness is to indicate a fully clear face image. Compared to categorizing the input face images into two categories (i.e., blurred face image and clear face image), categorizing the input face images into three categories facilitates the improvement of accuracy.

Step S1022: In response to the facial blurriness classification result being a first-level blurriness, determine that the human face in the face image is blurred.

Specifically, the blurriness of the human face in the face image is classified in the first neural network model. When the blurriness of the human face in the face image is classified as first-level blurriness, the human face in the face image is determined as "blurred".

Step S1023: In response to the facial blurriness classification result being a second-level blurriness, determine that the preliminary detection result meets a deep detection condition.

Specifically, the blurriness of the human face in the face image is classified in the first neural network model. When the blurriness of the human face in the face image is classified as second-level blurriness, the human face in the face image is determined as "moderate clear". In this case, the face image needs to be further checked. That is, when the facial blurriness classification result is a second-level blurriness, it is determined that the preliminary detection result meets the deep detection condition.

Step S1024: In response to the facial blurriness classification result being a third-level blurriness, determine that the human face in the face image is clear.

Specifically, the blurriness of the human face in the face image is classified in the first neural network model. When the blurriness of the human face in the face image is classified as third-level blurriness, the human face in the face image is determined as "clear".

Step S103: In response to the preliminary detection result meeting a deep detection condition, input the face image to a second neural network model to perform deep detection on the blurriness of the human face in the face image to obtain a deep detection result.

Specifically, when the preliminary detection result meets the deep detection condition, the face image meeting the deep detection condition will be inputted into the second neural network model to perform deep detection on the blurriness of the human face in the face image to obtain and output the deep detection result.

Figure 4:
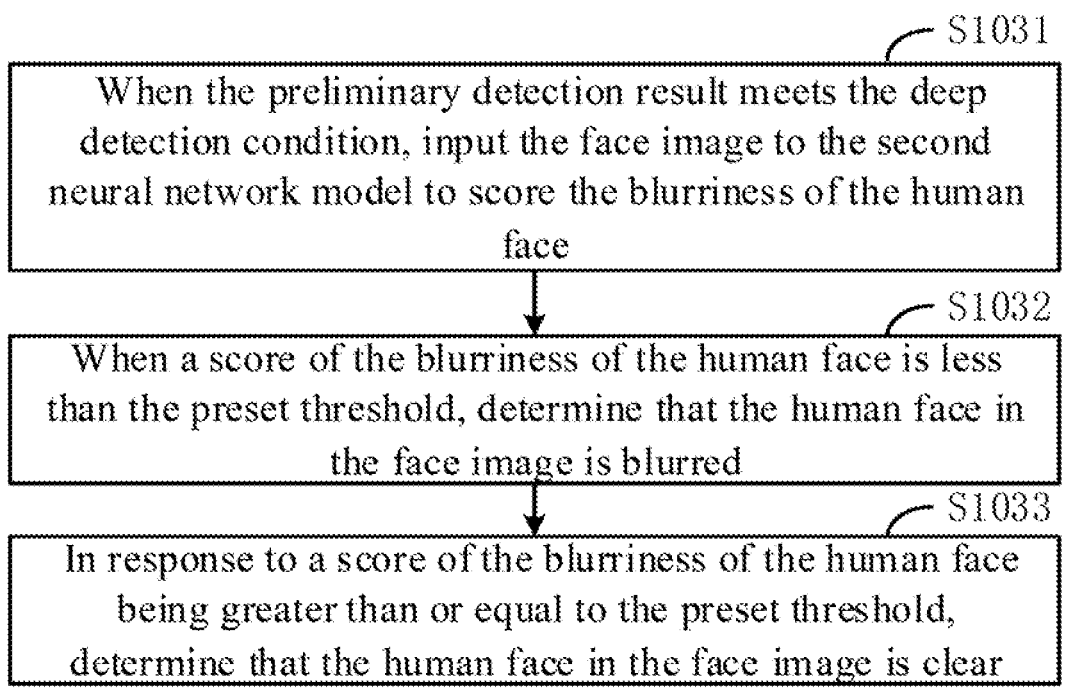
FIG. 4 is a flowchart of a method for obtaining a deep detection result according to one embodiment.

Referring to FIG. 4, in one embodiment, step S103 may include steps S1031 to S1033.

Step S1031: In response to the preliminary detection result meeting the deep detection condition, input the face image to the second neural network model to score the blurriness of the human face.

In one embodiment, the second neural network model here is a trained neural network model for scoring the blurriness of the face in the input face image to obtain the score the blurriness of the human face.

Step S1032: In response to a score of the blurriness of the human face being less than the preset threshold, determine that the human face in the face image is blurred.

When the score of the blurriness of the human face is less than the preset threshold, it is determined that the human face in the face image is blurred.

Step S1033: In response to a score of the blurriness of the human face being greater than or equal to the preset threshold, determine that the human face in the face image is clear.

When the score of the blurriness of the human face is greater than or equal to the preset threshold, it is determined that the human face in the face image is clear.

In one embodiment, the method may include, before performing a face detection in a target image, training the second neural network model. The output result of the second neural network model is the score of the blurriness of the human face.

In one embodiment, the second neural network model can use a lightweight network for network design, such as a neural network model constructed based on a lightweight neural network such as mobilenetv2, mobilenetv3_small, smallmobilenetv2, shufflenetv2 or mobileface.

Figure 5:
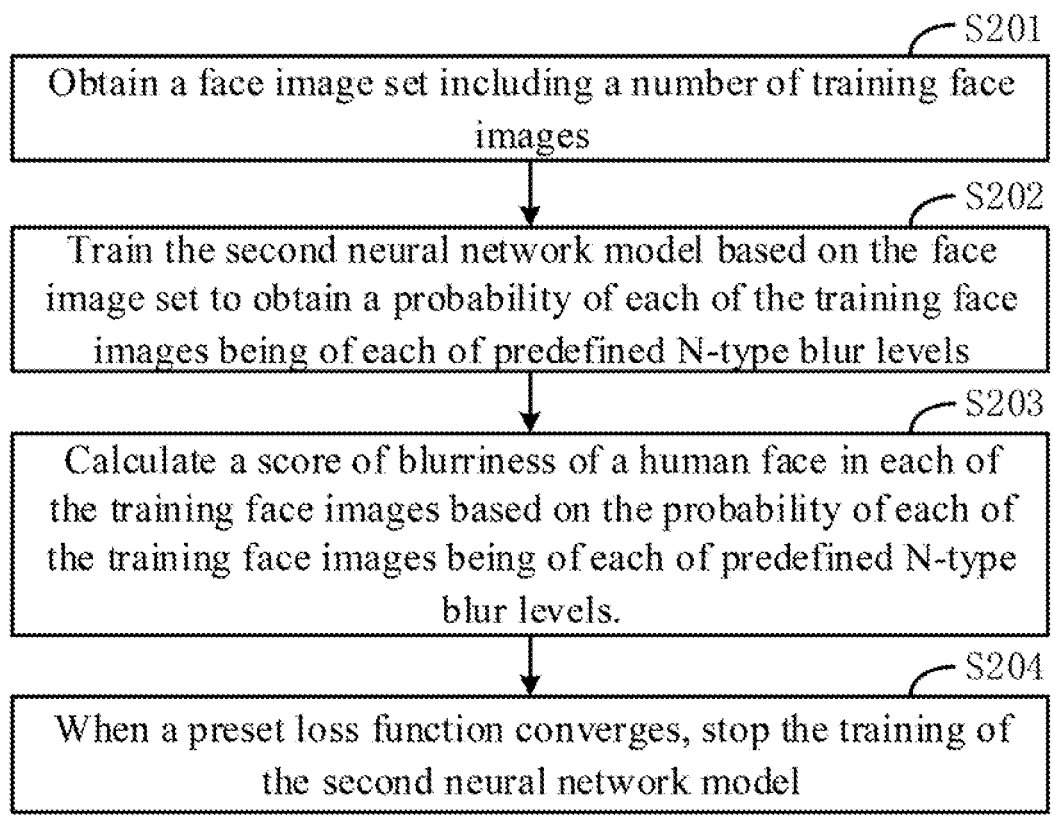
FIG. 5 is a flowchart of a method for training a second neural network model according to one embodiment.
Figure 6:
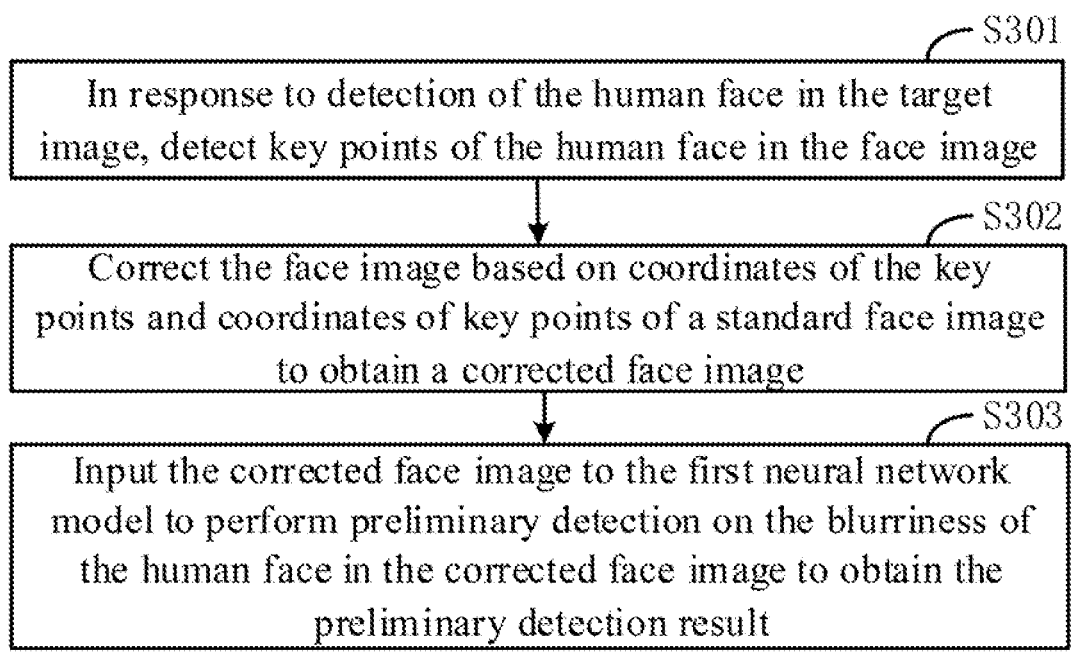
FIG. 6 is a flowchart of a method for detecting blurriness of a human face in a target image according to one embodiment.

Referring to FIG. 5, in one embodiment, training the second neural network model may include the following steps.

Step S201: Obtain a face image set including a number of training face images.

Specifically, a large number of face images are obtained in advance, and the score of the blurriness of a human face in each face image is then flagged. The flagged face image set is used as the training face image set to train the second neural network model.

Step S202: Train the second neural network model based on the face image set to obtain a probability of each of the training face images being of each of predefined N-type blur levels, where $N \geq 2$.

Specifically, the training face image set is inputted to the second neural network model to obtain the probability of each of the training face images being of each of predefined N-type blur levels.

Step S203: Calculate a score of blurriness of a human face in each of the training face images based on the probability of each of the training face images being of each of predefined N-type blur levels.

In an exemplary application scenario, the score of blurriness of each human face can be obtained based on the idea of deep expectation DEX, such as combining the ideas of classification and regression to train the second neural network model, and performing classification training first. For example, the classification network in the second neural network model will classify, and the output is three categories (i.e., first-level blurriness, second-level blurriness, and third-level blurriness). It is assumed that the default score y={0, 60, 100} is assigned, that is, the default score of the first-level blurriness is 0, the default score of the second-level blurriness is 60, and the default score of the third-level blurriness is 100. The classification network layer in the second neural network can obtain the probability o={o1, o2, o3} that the blurriness of each human face is classified into these three categories, and the final scores of the input face images can be calculated according to the probability of the classification result.

In one embodiment, the score of blurriness of the human face in each of the training face images is calculated according to the following formula:

$$E(O) = \sum_{i}^{N} y_i \times o_i,$$

where E(O) represents the score of blurriness of the human face, $y_i$ represents the probability of each of the training face images being of a predefined i-type blur level, and $O_i$ represents a score of the i-type blur level. The value of N is set to 3 when the output is three categories.

In one exemplary application, it is assumed that the face images are classified into 3 categories, and the default scores of the three blurriness levels (first-level blurriness, second-level blurriness, and third-level blurriness) y={0, 60, 100}. The classification network in the second neural network obtains the results of these three categories o={o1, o2, o3}, where o1, o2, and 03 respectively represent the probability of facial blurriness being classified into the three categories. Each blurriness level y is then multiplied by the probability of the corresponding category according to the formula $$E(O) = \sum_{i}^{N} y_i \times o_i,$$

which finally obtains the facial blurriness score.

In one exemplary application scenario, when the blurriness of the face image input into the second neural network is a third-level blurriness (which indicates a clear face image), and the output score of the facial blurriness will be distributed around 100. When the blurriness of the face image input into the second neural network is a first-level blurriness (which indicates a blurred face image), and the output score of the facial blurriness will be distributed around 0. When the blurriness of the face image input into the second neural network is a second-level blurriness (which indicates a moderate clear face image), and the output score of the facial blurriness will be distributed around 60. If a face image is not clearer than a standard moderate clear face image, its score of blurriness will be less than 60. If a face image is clearer than the standard moderate clear face image, its score of blurriness will be greater than 60. Therefore, using 60 points as the threshold of the blurriness is helpful for face recognition.

Step S204: In response to a preset loss function converging, stop the training of the second neural network model, wherein the loss function is configured to indicate a difference between the calculated score of blurriness of a human face in each of the training face images and a pre-flagged score of blurriness of the human face in a corresponding one of the training face images.

In one embodiment, the preset loss function is to indicate the calculated difference between the angle values of the three posture angles of each of the face images and the angle values of the flagged three posture angles. The preset loss function may be a cross entropy loss function, a mean square error loss function and the like.

When the preset loss function of the neural network model does not converge, the procedure goes back to the step of training the second neural network model based on the face image set until the preset loss function converges. For example, in an exemplary application scenario, when the output value of the preset loss function is greater than the preset error value, the procedure goes back to the step of training the second neural network model based on the face image set until the output value of the preset loss function is less than or equal to a preset threshold.

Referring to FIG. 6, in one embodiment, step S102 may include steps S301 to S303.

Step S301: In response to detection of the human face in the target image, detect key points of the human face in the face image.

In one embodiment, the key points can be several feature points in key positions such as eyes, nose, and mouth of the human face. For example, the feature points can be the positions of the feature points extracted from positions such as the inner corner of the left eye, the inner corner of the right eye, the tip of the nose, the left corner of the mouth, and the right corner of the mouth. After the key points are detected, the coordinates of the corresponding key points in the face are determined.

Step S302: Correct the face image based on coordinates of the key points and coordinates of key points of a standard face image to obtain a corrected face image.

The range of the coordinates of the key points of the standard face image is predetermined. When the positions of the key points in the detected face image are not within the range of the positions of the key points of the standard face, the face image needs to be corrected. For example, the correction of the face image can be achieved through key point alignment for the coordinates of the facial feature points using similar transformation.

Step S303: Input the corrected face image to the first neural network model to perform preliminary detection on the blurriness of the human face in the corrected face image to obtain the preliminary detection result.

Specifically, after key point alignment of the face image, the aligned face image will be inputted to the first neural network model to perform preliminary detection on the blurriness of the human face in the corrected face image to obtain the preliminary detection result.

When the preliminary detection result meets the deep detection condition, the aligned face image will be inputted to the second neural network model to perform deep detection on the blurriness of the human face in the face image to obtain the deep detection result.

In the embodiments of the present disclosure, the face image is first preliminarily detected using the first neural network model, and when the preliminary detection result meets the deep detection condition, a deep detection will be performed using the second neural network to obtain the deep detection result of the blurriness of the human face, which can improve the accuracy of determining the blurriness of the human face in the target image.

Figure 7:
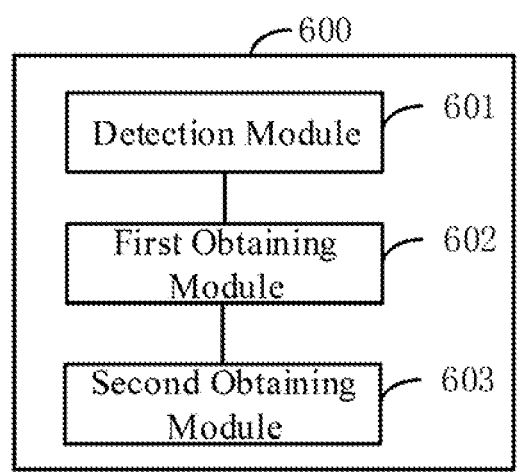
FIG. 7 is a schematic block diagram of a blurriness detecting device according to one embodiment.

FIG. 7 shows a schematic block diagram of a blurriness detecting device 600 according to one embodiment. The blurriness detecting device 600 may include a detection module 601, a first obtaining module 602, and a second obtaining module 603. The detection module 601 is to perform a face detection in a target image. The first obtaining module 602 is to, in response to detection of a human face in the target image, crop the human face from the target image to obtain a face image and input the face image to a first neural network model to perform preliminary detection on a blurriness of the human face in the face image to obtain a preliminary detection result. The second obtaining module 603 is to, in response to the preliminary detection result meeting a deep detection condition, input the face image to a second neural network model to perform deep detection on the blurriness of the human face in the face image to obtain a deep detection result.

Figure 8:
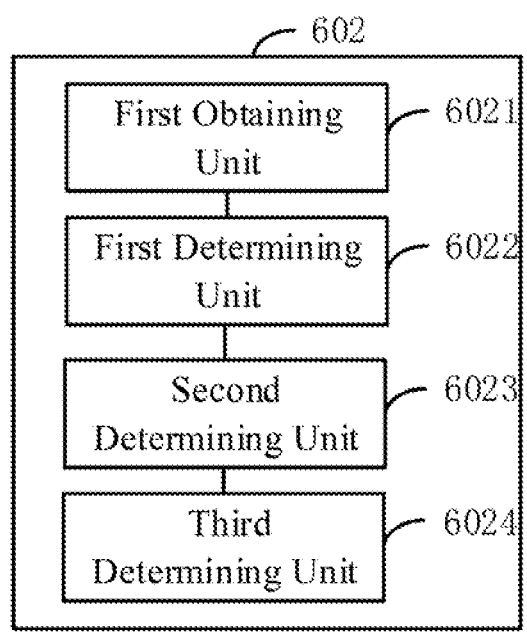
FIG. 8 is a schematic block diagram of a first obtaining module according to one embodiment.

Referring to FIG. 8, in one embodiment, the first obtaining module 602 may include a first obtaining unit 6021, a first determining unit 6022, a second determining unit 6023, and a third determining unit 6024. The first obtaining unit 6021 is to input the face image to the first neural network model to classify the blurriness of the human face in the face image to obtain a facial blurriness classification result. The facial blurriness classification result may include a first-level blurriness, a second-level blurriness, and a third-level blurriness that are arranged in descending order of blurriness. The first determining unit 6022 is to, in response to the facial blurriness classification result being a first-level blurriness, determine that the human face in the face image is blurred. The second determining unit 6023 is to, in response to the facial blurriness classification result being a second-level blurriness, determine that the preliminary detection result meets a deep detection condition. The third determining unit 6024 is to, in response to the facial blurriness classification result being a third-level blurriness, determine that the human face in the face image is clear.

Figure 9:
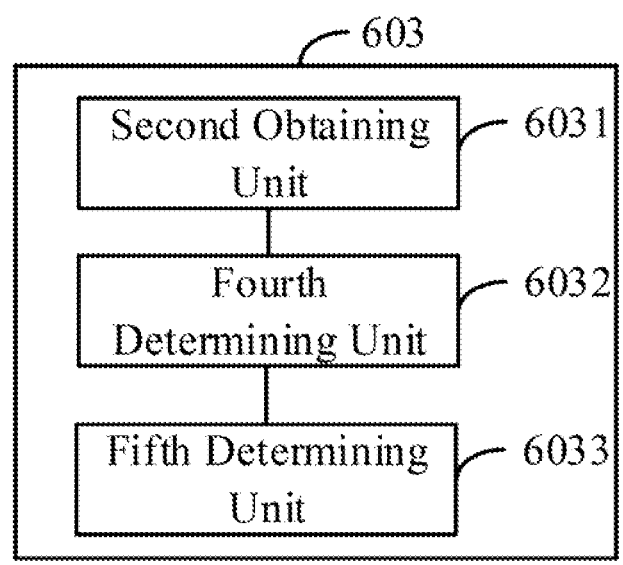
FIG. 9 is a schematic block diagram of a second obtaining module according to one embodiment.

Referring to FIG. 9, in one embodiment, the second obtaining module 603 may include a second obtaining unit 6031, a fourth determining unit 6032, and a fifth determining unit 6033. The second obtaining module 603 is to, in response to the preliminary detection result meeting the deep detection condition, input the face image to the second neural network model to score the blurriness of the human face. The fourth determining unit 6032 is to, in response to a score of the blurriness of the human face being less than the preset threshold, determine that the human face in the face image is blurred. The fifth determining unit 6032 is to, in response to a score of the blurriness of the human face being greater than or equal to the preset threshold, determine that the human face in the face image is clear.

In one embodiment, the first obtaining module 602 may include a detection unit, a correcting unit, and a third obtaining unit. The detection unit is to detect key points of the human face in the face image in response to detection of the human face in the target image. The correcting unit is to correct the face image based on coordinates of the key points and coordinates of key points of a standard face image to obtain a corrected face image. The third obtaining unit is to input the corrected face image to the first neural network model to perform preliminary detection on the blurriness of the human face in the corrected face image to obtain the preliminary detection result.

In one embodiment, the device 600 may further include a training module to train the second neural network model. The output result of the second neural network model is the score of the blurriness of the human face.

In one embodiment, the training module is configured to: obtain a face image set comprising a plurality of training face images; train the second neural network model based on the face image set to obtain a probability of each of the training face images being of each of predefined N-type blur levels, wherein N≤2; calculate a score of blurriness of a human face in each of the training face images based on the probability of each of the training face images being of each of predefined N-type blur levels; and in response to a preset loss function converging, stop the training of the second neural network model. The loss function indicates a difference between the calculated score of blurriness of a human face in each of the training face images and a pre-flagged score of blurriness of the human face in a corresponding one of the training face images.

In one embodiment, the score of blurriness of the human face in each of the training face images is calculated according to the following formula:

$$E(O) = \sum_{i}^{N} y_i \times o_i,$$

where E(O) represents the score of blurriness of the human face, $y_i$ represents the probability of each of the training face images being of a predefined i-type blur level, and $O_i$ represents a score of the i-type blur level.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals. It should be noted that, the content included in the computer readable medium could be appropriately increased and decreased according to requirements of legislation and patent practice under judicial jurisdictions. For example, in some judicial jurisdictions, the computer readable medium does not include the electric carrier signal and the telecommunication signal according to the legislation and the patent practice.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented method for detecting blurriness of a human face in an image, the method comprising:
    performing a face detection in a target image;
    in response to detection of a human face in the target image, cropping the human face from the target image to obtain a face image and inputting the face image to a first neural network model to perform preliminary detection on a blurriness of the human face in the face image to obtain a preliminary detection result; and
    in response to the preliminary detection result meeting a deep detection condition, inputting the face image to a second neural network model to perform deep detection on the blurriness of the human face in the face image to obtain a deep detection result.

2. The method according to claim 1, wherein inputting the face image to the first neural network model to perform preliminary detection on the blurriness of the human face in the face image to obtain the preliminary detection result comprises:
    inputting the face image to the first neural network model to classify the blurriness of the human face in the face image to obtain a facial blurriness classification result, wherein the facial blurriness classification result comprises a first-level blurriness, a second-level blurriness, and a third-level blurriness that are arranged in descending order of blurriness;
    in response to the facial blurriness classification result being a first-level blurriness, determining that the human face in the face image is blurred;
    in response to the facial blurriness classification result being a second-level blurriness, determining that the preliminary detection result meets a deep detection condition; and
    in response to the facial blurriness classification result being a third-level blurriness, determining that the human face in the face image is clear.

3. The method according to claim 2, wherein inputting the face image to the second neural network model to perform deep detection on the blurriness of the human face in the face image to obtain the deep detection result comprises:
    in response to the preliminary detection result meeting the deep detection condition, inputting the face image to the second neural network model to score the blurriness of the human face;
    in response to a score of the blurriness of the human face being less than the preset threshold, determining that the human face in the face image is blurred; and
    in response to a score of the blurriness of the human face being greater than or equal to the preset threshold, determining that the human face in the face image is clear.

4. The method according to claim 2, wherein inputting the face image to the first neural network model to perform preliminary detection on the blurriness of the human face in the face image to obtain the preliminary detection result comprises:
    in response to detection of the human face in the target image, detecting key points of the human face in the face image;
    correcting the face image based on coordinates of the key points and coordinates of key points of a standard face image to obtain a corrected face image;
    inputting the corrected face image to the first neural network model to perform preliminary detection on the blurriness of the human face in the corrected face image to obtain the preliminary detection result.

5. The method according to claim 3, further comprising, before performing the face detection in the target image,
    training the second neural network model, wherein an output result of the second neural network model is the score of the blurriness of the human face.

6. The method according to claim 5, wherein training the second neural network model comprises:
    obtaining a face image set comprising a plurality of training face images;
    training the second neural network model based on the face image set to obtain a probability of each of the training face images being of each of predefined N-type blur levels, wherein N≥2;
    calculating a score of blurriness of a human face in each of the training face images based on the probability of each of the training face images being of each of predefined N-type blur levels; and
    in response to a preset loss function converging, stopping the training of the second neural network model, wherein the loss function is configured to indicate a difference between the calculated score of blurriness of a human face in each of the training face images and a pre-flagged score of blurriness of the human face in a corresponding one of the training face images.

7. The method according to claim 6, wherein the score of blurriness of the human face in each of the training face images is calculated according to a following formula:

$$E(O) = \sum_{i}^{N} y_i \times o_i,$$

where E(O) represents the score of blurriness of the human face, $y_i$ represents the probability of each of the training face images being of a predefined i-type blur level, and $O_i$ represents a score of the i-type blur level.

8. A device for detecting blurriness of a human face in an image, the device comprising:
    one or more processors;
    a memory; and
    one or more programs, wherein the one or more programs are stored in the memory and configured to be executed by the one or more processors, the one or more programs comprise:
    performing a face detection in a target image;

in response to detection of a human face in the target image, cropping the human face from the target image to obtain a face image and inputting the face image to a first neural network model to perform preliminary detection on a blurriness of the human face in the face image to obtain a preliminary detection result; and in response to the preliminary detection result meeting a deep detection condition, inputting the face image to a second neural network model to perform deep detection on the blurriness of the human face in the face image to obtain a deep detection result.

9. The device according to claim 8, wherein the instructions for inputting the face image to the first neural network model to perform preliminary detection on the blurriness of the human face in the face image to obtain the preliminary detection result comprise:

instructions for inputting the face image to the first neural network model to classify the blurriness of the human face in the face image to obtain a facial blurriness classification result, wherein the facial blurriness classification result comprises a first-level blurriness, a second-level blurriness, and a third-level blurriness that are arranged in descending order of blurriness;

instructions for, in response to the facial blurriness classification result being a first-level blurriness, determining that the human face in the face image is blurred;

instructions for, in response to the facial blurriness classification result being a second-level blurriness, determining that the preliminary detection result meets a deep detection condition; and instructions for, in response to the facial blurriness classification result being a third-level blurriness, determining that the human face in the face image is clear.

10. The device according to claim 9, wherein the instructions for inputting the face image to the second neural network model to perform deep detection on the blurriness of the human face in the face image to obtain the deep detection result comprise:

instructions for, in response to the preliminary detection result meeting the deep detection condition, inputting the face image to the second neural network model to score the blurriness of the human face;

instructions for, in response to a score of the blurriness of the human face being less than the preset threshold, determining that the human face in the face image is blurred; and instructions for, in response to a score of the blurriness of the human face being greater than or equal to the preset threshold, determining that the human face in the face image is clear.

11. The device according to claim 10, wherein the instructions for inputting the face image to the first neural network model to perform preliminary detection on the blurriness of the human face in the face image to obtain the preliminary detection result comprise:

instructions for, in response to detection of the human face in the target image, detecting key points of the human face in the face image;

instructions for, correcting the face image based on coordinates of the key points and coordinates of key points of a standard face image to obtain a corrected face image;

instructions for, inputting the corrected face image to the first neural network model to perform preliminary detection on the blurriness of the human face in the corrected face image to obtain the preliminary detection result.

12. The device according to claim 10, wherein the one or more programs further comprise:

Instructions for training the second neural network model before performing the face detection in the target image, wherein an output result of the second neural network model is the score of the blurriness of the human face.

13. The device according to claim 12, wherein the instructions for training the second neural network model comprise:

instructions for obtaining a face image set comprising a plurality of training face images;

instructions for training the second neural network model based on the face image set to obtain a probability of each of the training face images being of each of predefined N-type blur levels, wherein N≥2;

instructions for calculating a score of blurriness of a human face in each of the training face images based on the probability of each of the training face images being of each of predefined N-type blur levels; and instructions for, in response to a preset loss function converging, stopping the training of the second neural network model, wherein the loss function is configured to indicate a difference between the calculated score of blurriness of a human face in each of the training face images and a pre-flagged score of blurriness of the human face in a corresponding one of the training face images.

14. The device according to claim 13, wherein the score of blurriness of the human face in each of the training face images is calculated according to a following formula:

$$E(O) = \sum_{i}^{N} y_i \times o_i,$$

where E(O) represents the score of blurriness of the human face, $y_i$ represents the probability of each of the training face images being of a predefined i-type blur level, and $O_i$ represents a score of the i-type blur level.

15. A non-transitory computer-readable storage medium storing one or more programs to be executed in a device, the one or more programs, when being executed by one or more processors of the device, causing the device to perform processing comprising:

performing a face detection in a target image;

in response to detection of a human face in the target image, cropping the human face from the target image to obtain a face image and inputting the face image to a first neural network model to perform preliminary detection on a blurriness of the human face in the face image to obtain a preliminary detection result; and in response to the preliminary detection result meeting a deep detection condition, inputting the face image to a second neural network model to perform deep detection on the blurriness of the human face in the face image to obtain a deep detection result.

16. The computer-readable storage medium according to claim 15, wherein inputting the face image to the first neural network model to perform preliminary detection on the blurriness of the human face in the face image to obtain the preliminary detection result comprises:

inputting the face image to the first neural network model to classify the blurriness of the human face in the face image to obtain a facial blurriness classification result, wherein the facial blurriness classification result comprises a first-level blurriness, a second-level blurriness, and a third-level blurriness that are arranged in descending order of blurriness;

in response to the facial blurriness classification result being a first-level blurriness, determining that the human face in the face image is blurred;

in response to the facial blurriness classification result being a second-level blurriness, determining that the preliminary detection result meets a deep detection condition; and in response to the facial blurriness classification result being a third-level blurriness, determining that the human face in the face image is clear.

17. The computer-readable storage medium according to claim 16, wherein inputting the face image to the second neural network model to perform deep detection on the blurriness of the human face in the face image to obtain the deep detection result comprises:

in response to the preliminary detection result meeting the deep detection condition, inputting the face image to the second neural network model to score the blurriness of the human face;

in response to a score of the blurriness of the human face being less than the preset threshold, determining that the human face in the face image is blurred; and in response to a score of the blurriness of the human face being greater than or equal to the preset threshold, determining that the human face in the face image is clear.

18. The computer-readable storage medium according to claim 16, wherein inputting the face image to the first neural network model to perform preliminary detection on the blurriness of the human face in the face image to obtain the preliminary detection result comprises:

in response to detection of the human face in the target image, detecting key points of the human face in the face image;

correcting the face image based on coordinates of the key points and coordinates of key points of a standard face image to obtain a corrected face image;

inputting the corrected face image to the first neural network model to perform preliminary detection on the blurriness of the human face in the corrected face image to obtain the preliminary detection result.

19. The computer-readable storage medium according to claim 17, further comprising, before performing the face detection in the target image, training the second neural network model, wherein an output result of the second neural network model is the score of the blurriness of the human face.

20. The computer-readable storage medium according to claim 19, wherein training the second neural network model comprises:

obtaining a face image set comprising a plurality of training face images;

training the second neural network model based on the face image set to obtain a probability of each of the training face images being of each of predefined N-type blur levels, wherein N≥2;

calculating a score of blurriness of a human face in each of the training face images based on the probability of each of the training face images being of each of predefined N-type blur levels; and in response to a preset loss function converging, stopping the training of the second neural network model, wherein the loss function is configured to indicate a difference between the calculated score of blurriness of a human face in each of the training face images and a pre-flagged score of blurriness of the human face in a corresponding one of the training face images.

* * * * *